United States Patent
Hakola et al.

(10) Patent No.: US 12,395,227 B2
(45) Date of Patent: Aug. 19, 2025

(54) DEVICES, METHODS, AND APPARATUSES OF COHERENT JOINT TRANSMISSION

(71) Applicant: NOKIA TECHNOLOGIES OY, Espoo (FI)

(72) Inventors: Sami-Jukka Hakola, Oulu (FI); Timo Koskela, Oulu (FI); Juha Pekka Karjalainen, Oulu (FI); Filippo Tosato, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/930,297

(22) Filed: Oct. 29, 2024

(65) Prior Publication Data
US 2025/0055552 A1 Feb. 13, 2025

Related U.S. Application Data

(63) Continuation of application No. PCT/IB2023/061083, filed on Nov. 2, 2023.

(30) Foreign Application Priority Data

Nov. 4, 2022 (GB) .................................. 2216440

(51) Int. Cl.
*H04B 7/06* (2006.01)
*H04B 7/024* (2017.01)

(52) U.S. Cl.
CPC ......... *H04B 7/06968* (2023.05); *H04B 7/024* (2013.01)

(58) Field of Classification Search
CPC ............... H04W 72/23; H04W 72/232; H04W 72/0446; H04W 72/046; H04W 76/27; H04W 72/1273; H04W 72/04; H04L 5/0053; H04L 5/0048; H04L 5/0023;
(Continued)

(56) References Cited

U.S. PATENT DOCUMENTS

| 2021/0352649 A1 | 11/2021 | Kim et al. | |
| 2024/0057111 A1* | 2/2024 | Lin | ........................ H04L 5/0053 |
| 2024/0090073 A1* | 3/2024 | Zhu | ........................ H04W 76/27 |

FOREIGN PATENT DOCUMENTS

| CN | 115 191 101 A | 10/2022 |
| WO | 2020/069415 A1 | 4/2020 |

OTHER PUBLICATIONS

International Search Report and Written Opinion dated Jan. 31, 2024 corresponding to International Patent Application No. PCT/IB2023/061083.
(Continued)

*Primary Examiner* — Khalid W Shaheed
(74) *Attorney, Agent, or Firm* — SQUIRE PATTON BOGGS (US) LLP

(57) ABSTRACT

Embodiments of the present disclosure disclose devices, methods and apparatuses of coherent joint transmission. A terminal device may receive a QCL source configuration from a network device. The QCL source configuration may indicate at least two transmission configuration indication (TCI) states that indicate reference signals from valid QCL sources for a coherent joint transmission (CJT) of tracking reference signals (TRSs). The terminal device may perform a QCL property estimation on received TRSs based on the QCL source configuration.

16 Claims, 9 Drawing Sheets

(58) Field of Classification Search
CPC ... H04L 5/0094; H04L 5/0044; H04L 5/0035; H04L 5/0055
See application file for complete search history.

(56) References Cited

OTHER PUBLICATIONS

Combined Search and Examination Report under Sections 17 and 18(3) dated May 10, 2023 corresponding to GB Application No. GB2216440.4.
Ericsson, "Unified TCI framework extension for multiple TCI states," 3GPP Draft; R1-2208676, 3GPP TSG-RAN WG1 Meeting #110bis-e, e-Meeting, Oct. 10-19, 2022, Sep. 30, 2022, XP052276599.

* cited by examiner

DEVICES, METHODS, AND APPARATUSES OF COHERENT JOINT TRANSMISSION

RELATED APPLICATION

This application is a Continuation of International Patent Application No. PCT/IB2023/061083 filed Nov. 2, 2023, and which claims priority from GB Application No. 2216440.4, filed Nov. 4, 2022, the disclosures of which are hereby incorporated by reference in their entirety.

FIELD

Embodiments of the present disclosure generally relate to the field of communication, and in particular, to devices, methods, apparatuses and computer readable storage medium for coherent joint transmission.

BACKGROUND

In new radio (NR) system, cooperative transmission schemes may be used for a multi-transmit and receive point (TRP) operation. The cooperative transmission schemes may be divided into two types: coherent joint transmission (CJT) and non-coherent joint transmission (NCJT), which depends on a mapping relationship between layers of transmitted data and the multiple TRPs.

In physical downlink shared channel (PDSCH) transmission in the CJT from multiple TRPs, channel characteristics at a terminal device's receiver may change according to a precoder used in joint precoding. In addition, different numbers of TRPs may be involved in different PDSCH transmission instants. Therefore, the terminal device needs to estimate channel characteristics for the PDSCH reception based on a set of TRP specific tracking reference signals (TRSs), which may bring some challenges to the current system.

SUMMARY

In general, example embodiments of the present disclosure provide devices, methods, apparatuses and computer readable storage medium of coherent joint transmission.

In a first aspect, there is provided a terminal device. The terminal device may comprise one or more transceivers; and one or more processors communicatively coupled to the one or more transceivers, and the one or more processors are configured to cause the terminal device to: receive a quasi-co-location (QCL) source configuration from a network device, wherein the QCL source configuration indicates at least two transmission configuration indication (TCI) states that indicate reference signals from valid QCL sources for a coherent joint transmission (CJT) of tracking reference signals (TRSs); and perform a QCL property estimation on received TRSs based on the QCL source configuration.

In a second aspect, there is provided a network device. The network device may comprise one or more transceivers; and one or more processors communicatively coupled to the one or more transceivers, and the one or more processors are configured to cause the network device to: receive a result of measurements on a set of channel state information-reference signals (CSI-RSs) from a terminal device; and transmit a quasi-co-location (QCL) source configuration to the terminal device, wherein the QCL source configuration indicates at least two transmission configuration indication (TCI) states that indicate reference signals from valid QCL sources for a coherent joint transmission (CJT) of tracking reference signals (TRSs), based on the result of measurements on a set of CSI-RSs.

In a third aspect, there is provided a method implemented at a terminal device. The method may comprise: receiving a quasi-co-location (QCL) source configuration from a network device, wherein the QCL source configuration indicates at least two transmission configuration indication (TCI) states that indicate reference signals from valid QCL sources for a coherent joint transmission (CJT) of tracking reference signals (TRSs); and performing a QCL property estimation on received TRSs based on the QCL source configuration.

In a fourth aspect, there is provided a method implemented at a network device. The method may comprise: receiving a result of measurements on a set of channel state information-reference signals (CSI-RSs) from a terminal device; and transmitting a quasi-co-location (QCL) source configuration to the terminal device, wherein the QCL source configuration indicates at least two transmission configuration indication (TCI) states that indicate reference signals from valid QCL sources for a coherent joint transmission (CJT) of tracking reference signals (TRSs), based on the result of measurements on a set of CSI-RSs.

In a fifth aspect, there is provided an apparatus of a terminal device. The apparatus may comprise: means for receiving a quasi-co-location (QCL) source configuration from a network device, wherein the QCL source configuration indicates at least two transmission configuration indication (TCI) states that indicate reference signals from valid QCL sources for a coherent joint transmission (CJT) of tracking reference signals (TRSs); and means for performing a QCL property estimation on received TRSs based on the QCL source configuration.

In a sixth aspect, there is provided an apparatus of a network device. The apparatus may comprise: means for receiving a result of measurements on a set of channel state information-reference signals (CSI-RSs) from a terminal device; and means for transmitting a quasi-co-location (QCL) source configuration to the terminal device, wherein the QCL source configuration indicates at least two transmission configuration indication (TCI) states that indicate reference signals from valid QCL sources for a coherent joint transmission (CJT) of tracking reference signals (TRSs), based on the result of measurements on a set of CSI-RSs.

In a seventh aspect, there is provided a terminal device. The terminal device may comprise at least one processor; and at least one memory including computer program codes, wherein the at least one memory and the computer program codes are configured to, with the at least one processor, cause the terminal device to: receive a quasi-co-location (QCL) source configuration from a network device, wherein the QCL source configuration indicates at least two transmission configuration indication (TCI) states that indicate reference signals from valid QCL sources for a coherent joint transmission (CJT) of tracking reference signals (TRSs); and perform a QCL property estimation on received TRSs based on the QCL source configuration.

In an eighth aspect, there is provided a network device. The network device may comprise at least one processor; and at least one memory including computer program codes, wherein the at least one memory and the computer program codes are configured to, with the at least one processor, cause the network device to: receive a result of measurements on a set of channel state information-reference signals (CSI-RSs) from a terminal device; and transmit a quasi-colocation (QCL) source configuration to the terminal device, wherein the QCL source configuration indicates at least two transmission configuration indication (TCI) states that indicate reference signals from valid QCL sources for a coherent joint transmission (CJT) of tracking reference signals (TRSs), based on the result of measurements on a set of CSI-RSs.

In a ninth aspect, there is provided a non-transitory computer readable medium comprising program instructions for causing an apparatus to perform at least the method according to third or fourth aspect.

In a tenth aspect, there is provided a computer program comprising instructions, which, when executed by an apparatus, cause the apparatus at least to: receive a quasi-co-location (QCL) source configuration from a network device, wherein the QCL source configuration indicates at least two transmission configuration indication (TCI) states that indicate reference signals from valid QCL sources for a coherent joint transmission (CJT) of tracking reference signals (TRSs); and perform a QCL property estimation on received TRSs based on the QCL source configuration.

In an eleventh aspect, there is provided a computer program comprising instructions, which, when executed by an apparatus, cause the apparatus at least to: receive a result of measurements on a set of channel state information-reference signals (CSI-RSs) from a terminal device; and transmit a quasi-co-location (QCL) source configuration to the terminal device, wherein the QCL source configuration indicates at least two transmission configuration indication (TCI) states that indicate reference signals from valid QCL sources for a coherent joint transmission (CJT) of tracking reference signals (TRSs), based on the result of measurements on a set of CSI-RSs.

In a twelfth aspect, there is provided a terminal device. The terminal device comprises: a receiving circuitry, configured to receive a quasi-co-location (QCL) source configuration from a network device, wherein the QCL source configuration indicates at least two transmission configuration indication (TCI) states that indicate reference signals from valid QCL sources for a coherent joint transmission (CJT) of tracking reference signals (TRSs); and an estimation circuitry, configured to perform a QCL property estimation on received TRSs based on the QCL source configuration.

In a thirteenth aspect, there is provided a network device. The network device comprises: a receiving circuitry, configured to receive a result of measurements on a set of channel state information-reference signals (CSI-RSs) from a terminal device; and a transmitting circuitry, configured to transmit a quasi-co-location (QCL) source configuration to the terminal device, wherein the QCL source configuration indicates at least two transmission configuration indication (TCI) states that indicate reference signals from valid QCL sources for a coherent joint transmission (CJT) of tracking reference signals (TRSs), based on the result of measurements on a set of CSI-RSs.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
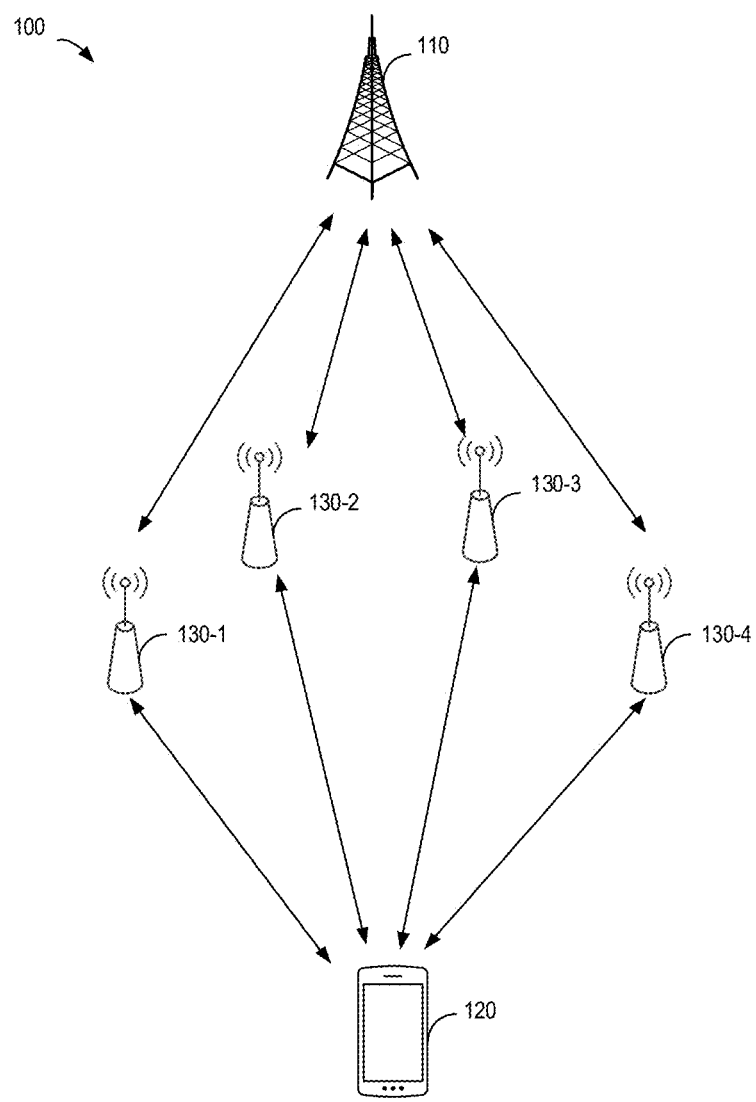
FIG. 1 illustrates an example communication network environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein may be implemented in various manners other than the ones described below.

In the following description and claims, unless defined otherwise, all technical and scientific terms used herein have the same meaning as commonly understood by one of ordinary skills in the art to which the present disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It may be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s) that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as long term evolution (LTE), LTE-advanced (LTE-A), wideband code division multiple access (WCDMA), high-speed packet access (HSPA), narrow band Internet of things (NB-IoT) and so on. Furthermore, the communications between a terminal device and a network device in the communication network may be performed according to any suitable generation communication protocols, including, but not limited to, the third generation (3G), the fourth generation (4G), 4.5G, the fifth generation (5G) communication protocols, the sixth generation (6G) communication protocols and/or beyond. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the current NR system, the multi-TRP operation has been introduced to improve the performance of communication system. Cooperative transmission schemes may be used for the multi-TRP. Depending on a mapping relationship between layers of transmitted data and multiple transmission and reception points (TRPs), the multi-TRP cooperative transmission schemes may be divided into two types: coherent joint transmission (CJT) and non-coherent joint transmission (NCJT).

In the CJT, data transmitted by multiple TRPs are jointly beam-formed, and precoding matrices (relative phase) applied on different TRPs are coordinated so that the data in the same layer can be coherently combined at the terminal device receiving the transmitted data. In other words, the subarrays of multiple TRPs are modelled as a higher-dimensional antenna ports array to obtain a higher beamforming gain. The CJT scheme usually has relatively high requirements for synchronization and cooperation between multiple TRPs. However, in the practical deployment environment of NR, the cooperation performance between TRPs is easily affected by some non-ideal factors such as frequency deviation.

Beamforming may be referred to as spatial filtering, directional transmission, or directional reception. Beamforming is a signal processing technique that may be used at a transmitting device and/or a receiving device to shape or steer an antenna beam along a spatial path between the transmitting device and the receiving device. Beamforming may rely on antenna elements of an antenna array for signals propagating at specific orientations.

As used herein, the term "beam" may refer to a communication resource. Different beams may be considered as different resources. A beam may also be represented as a spatial filter. A technology for forming a beam may be a beamforming technology or another technology. The beamforming technology may be specifically a digital beamforming technology, analog beamforming technology, or a hybrid digital/analog beamforming technology. A communication device (including the terminal device and the network device) may communicate with another communication device through one or more beams. One beam may include one or more antenna ports and be configured for a data channel, a control channel, or the like. One or more antenna ports forming one beam may also be considered as an antenna port set. A beam may be configured with a set of resource, or a set of resource for measurement, and a beam may be represented by for example a reference signal and/or related resource for the reference signal. A beam may also represent by a reference cell identifier or resource identifier.

In NR, the terminal device is provided with reference signals (RSs) via quasi-co-location (QCL) source information and may set channel estimation filters and related parameters based on the RSs to receive data transmission (e.g., DMRS of PDSCH and PDSCH transmission).

Two antenna ports are said to be quasi co-located if properties of the channel over which a symbol on one antenna port is conveyed can be inferred from the channel over which a symbol on the other antenna port is conveyed.

The PDSCH transmission in CJT from multiple TRPs is based on joint precoding across all the antenna ports of the TRPs involved in the CJT. The decision about the downlink precoder and rank may be made dynamically by a scheduler for each CJT PDSCH transmission based on the terminal device's channel state information (CSI) report and hybrid automatic repeat request (HARQ) feedback (inner-loop link adaptation). Therefore, the precoder may change from one PDSCH transmission instant to another PDSCH transmission instant.

Similarly, experienced signal characteristics due to combined effect of radio channel and applied precoder at the terminal device may change according to the applied precoder too. In addition, different numbers of TRPs may be involved in different PDSCH transmissions. Thus, the terminal device needs to estimate the channel characteristics for the PDSCH reception based on a set of TRP specific tracking reference signals (TRSs) changing from one PDSCH transmission to another PDSCH transmission.

Currently, the relationship between QCL source RS and the target signal is one to one and multiple QCL source RSs are not related to a single target signal. Therefore, it brings a challenge in estimating channel characteristics for the PDSCH reception based on a set of TRP specific tracking reference signals (TRSs) varying from time to time. Accordingly, a solution is required to enable the channel characteristics estimation.

In embodiments of the present disclosure, a QCL source configuration is utilized to inform the terminal device of valid QCL sources to facilitate QCL property estimation in coherent joint transmission. Specifically, according to embodiments of the present disclosure, a terminal device receives a quasi-co-location (QCL) source configuration from a network device, wherein the QCL source configuration indicates at least two transmission configuration indication (TCI) states that indicate reference signals from valid QCL sources for a coherent joint transmission (CJT) of tracking reference signals (TRSs). Then, the terminal device performs a QCL property estimation on received TRSs based on the QCL source configuration.

With this solution, the QCL source configuration is used to indicate the valid QCL resources by means of TCI states, which may reflect both changes of the QCL resources and changes of the precoders in the CJT transmission, and thus the terminal device may learn the relationship among the QCL resources and respective uplink transmissions in the CJT transmission. Thereby, the terminal device may estimate channel characteristics for the PDSCH reception based on a set of TRP specific tracking reference signals (TRSs).

As used herein, the term "quasi-co-location (QCL)" may define a relation between two antenna ports (or reference signals) at the terminal device. Two antenna ports may be referred to be QCL if a property of the channel (for example, a large scale channel property) over which a symbol on one antenna port is conveyed can be inferred from the channel over which a symbol on the other antenna port is conveyed. There are four types of QCL information corresponding to RSs, including Types A, B, C and D, and the QCL information may be used by the terminal device to facilitate CJT PDSCH transmission. For example, the terminal device may use the QCL information for CSI acquisition and channel condition estimation.

Herein after, for illustrative purposes, principle and example embodiments of the present disclosure for the channel information prediction will be described below with reference to FIGS. 1-8. However, it is to be noted that these embodiments are given to enable the skilled in the art to understand inventive concepts of the present disclosure and implement the solution as proposed herein, and not intended to limit scope of the present application in any way.

FIG. 1 illustrates an example communication network environment 100 in which example embodiments of the present disclosure may be implemented. The communication network environment 100, which may be a part of a communication network, includes terminal devices and network devices.

As illustrated in FIG. 1, the communication network environment 100 may include a network device 110 and a terminal device 120. In some embodiments, the network device 110 may include but not be limited to a NR NB (also referred to as a gNB), and the terminal device 120 may include but not be limited to a user equipment (UE). The network device 110 may communicate with the terminal device 120. In the communication network environment 100, a link from the network device 110 to the terminal device 120 may be referred to as a downlink, while a link from the terminal device 120 to the network device 110 may be referred to as an uplink.

In downlink, the network device 110 is a transmitting (TX) device (or a transmitter) while the terminal device 120 is a receiving (RX) device (or a receiver). In uplink, the terminal device 120 is a transmitting TX device (or a transmitter) while the first network device 110 is a RX device (or a receiver). In some embodiments, the network device 110 and the terminal device 120 may communicate with direct links/channels.

As shown in the example of FIG. 1, the communication network environment 100 may support a multi-TRP transmission. As illustrated in FIG. 1, the terminal device 120 may communicate with for example four TRPs, i.e., the TRPs 130-1, 130-2, 130-3, and 130-4 (collectively or individually referred to as TRPs 130). For purpose of illustration, the TRP 130-1 may be referred to as the first TRP 130-1, the TRP 130-2 may be referred to as the second TRP 130-2, the TRP 130-3 may be referred to as the third TRP 130-3, and the TRP 130-4 may be referred to as the fourth TRP 130-4.

It should be understood that, although four TRPs are shown in FIG. 1, the number of TRPs in the embodiments of the present disclosure is not limited to be four, and any other numbers of TRPs may be used in the communication network environment 100.

In some embodiments, the terminal device 120 may be served by multiple TRPs. The multiple TRPs may be associated with the network device 110. For example, the network device 110 may be associated with multiple TRPs to communicate with the terminal device 120. For example, as shown in FIG. 1, the network device is associated with the first TRP 130-1, the second TRP 130-2, the third TRP 130-3, and the fourth TRP 130-4.

In some embodiments, some of the multiple TRPs may be associated with a network device in a cell and some of the multiple TRPs may be associated with another network device in another cell. For example, the network device 110 may be associated with the first TRP 130-1 and the second TRP 130-2, and another network device (not shown) may be associated with the third TRP 130-3 and the fourth TRP 130-4.

In some embodiments, the network device may be associated with multiple TRPs in different geographical locations to achieve better coverage. In alternative embodiments, the network device 110 may be associated with multiple TRPs distributed in a same geographical location to achieve a relative fast communication speed.

It is to be understood that the number of the terminal device 120, the number of the network device 110, and the number of TRPSs 130 as shown in the communication network environment 100 in FIG. 1 are only for the purpose of illustration, without any limitation to the scope of the present disclosure. In some example embodiments, the communication network environment 100 may include any number of terminal devices, any number of network devices, and/or any number of TRPs. And in addition, each network device 110 according to embodiments of the present disclosure may support any number of TRPs.

Furthermore, communications among devices in the communication environment 100 may be implemented according to any appropriate communication protocol(s), including, but not limited to, cellular communication protocols of the third generation (3G), the fourth generation (4G) and the fifth generation (5G), the sixth generation (6G), and on the like, wireless local network communication protocols such as Institute for Electrical and Electronics Engineers (IEEE) 802.11 and the like, and/or any other protocols currently known or to be developed in the future. Moreover, the communication may utilize any appropriate wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In some embodiments, the network device 110 transmits a QCL source configuration indicating least two transmission configuration indication (TCI) states from a network device. In some embodiments, the at least two TCI states indicate reference signals from valid QCL sources for CJT TRSs. Then, the terminal device 120 performs a QCL property estimation on received TRSs based on the QCL source configuration.

Figure 2:
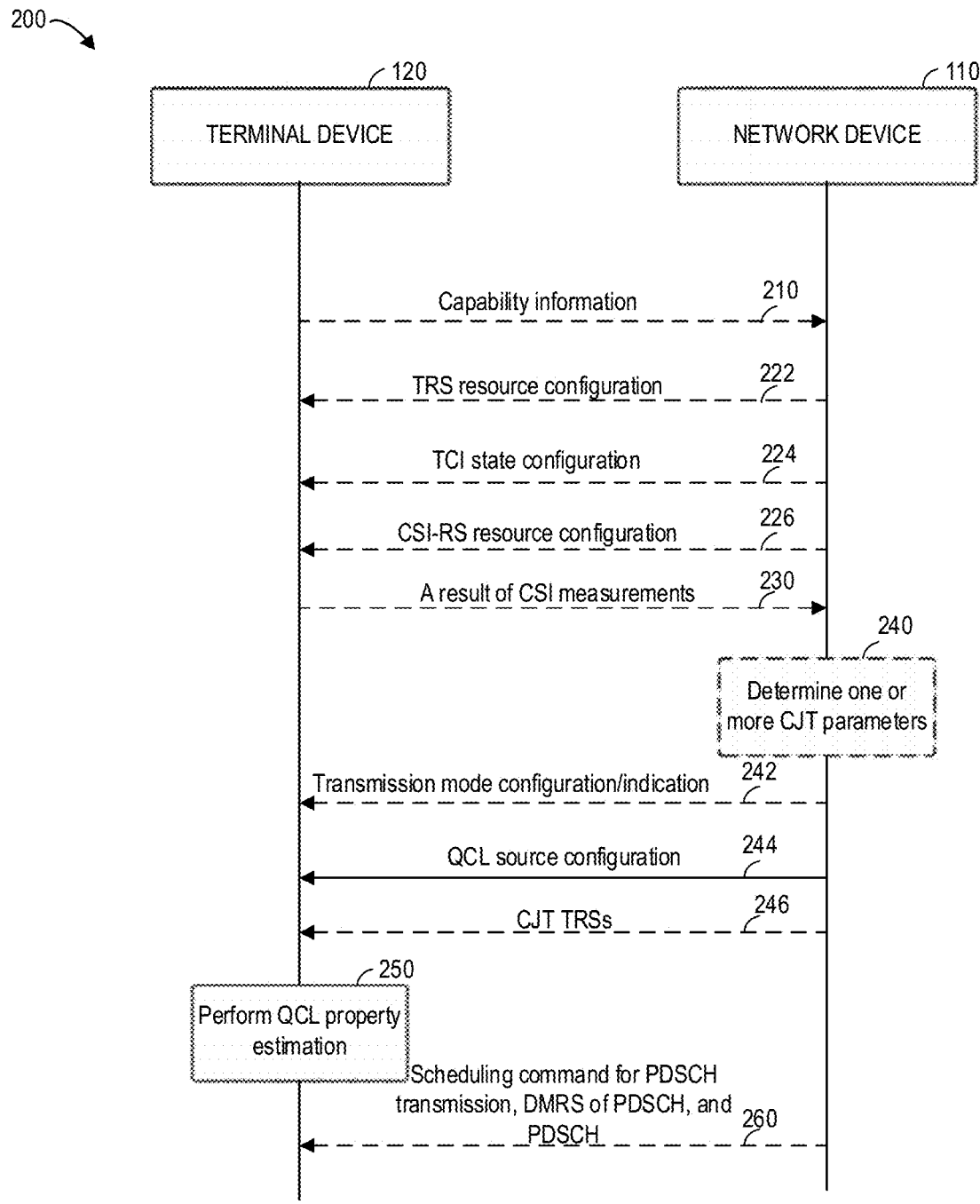
FIG. 2 illustrates an example signaling process for coherent joint transmission according to some embodiments of the present disclosure.

FIG. 2 illustrates an example signaling process 200 for coherent joint transmission according to some embodiments of the present disclosure. For the purpose of discussion, the process 200 will be described with reference to FIG. 1. The process 200 may involve the network device 110 and the terminal device 120 as shown in FIG. 1. More specifically, the process 200 may involve the terminal device 120, the network device 110, and the four TRPs 130-1 to 130-4 as illustrated in FIG. 1. In some embodiment, the network device 110 may support the multiple TRPs 130-1 to 130-4.

It may be understood that although only one terminal device 120 is shown in FIG. 2, the network device 110 may communicate with more than one terminal device. Similarly, although only one network device 110 is shown in FIG. 2, there may be more than one network device to support multiple TRPs, for example, 4 TRPs. In addition, although the process 200 is described in combination with the communication network environment 100 of FIG. 1, the process 200 may be likewise applied to other communication network scenarios with similar QCL source configuration requirements. Furthermore, in the process 200, it is possible to add, omit, modify one or more operations, or the operations may also be performed in any suitable order without departing from the scope of the present disclosure.

In the process 200, at 210, the terminal device 120 may report the capability information to the network device 110. The capability information may indicate that the terminal device 120 supports a CJT TRS transmission and reception and CJT PDSCH transmission. The network device 110 may receive the capability information from the terminal device 120, and configure the terminal device 120 to perform the CJT transmission and reception according to the capability information, which will be explained in detailed below with reference to the signaling process 200.

In some embodiments, at 222, the network device 110 may transmit a CJT TRS resource configuration to the terminal device 120 for configuration. The CJT TRS resource includes a CSI-RS resource specifically designed for the time-frequency tracking. In some embodiments, the CJT TRS resource configuration may include a periodic configuration, i.e., the terminal device 120 may be configured with periodic TRS resources. For example, the network device 110, associated with four TRPs 130-1 to 130-4, may be configured for the terminal device 120 with multiple TRS resource sets each having four periodic TRSs in a time slot.

In some embodiments, the network device 110 may transmit the CJT TRS resource configuration in a radio resource control (RRC) message. The TRS resource configuration may indicate one or more TRS resource sets, and each TRS resource set may include for example, four periodic non-zero-power channel state information-reference signal (NZP CSI-RS) resources in two consecutive time slots with two periodic NZP CSI-RS resources in each time slot.

In some embodiments, the network device 110 may transmit the TRS resource configuration in downlink control information (DCI) message. The TRS resource configuration may indicate one or both of an identity of a NZP CSI-RS resource set or an identity of a NZP CSI-RS resource. For example, the TRS resource configuration may indicate an identity of a NZP CSI-RS resource set. For another example, the TRS resource configuration may indicate an identity of a NZP CSI-RS resource. As another example, the TRS resource configuration may indicate both an identity of a NZP CSI-RS resource set and an identity of a NZP CSI-RS resource.

In some embodiments, the CJT TRS resource configuration may include an aperiodic configuration, i.e., the terminal device 120 may be configured with aperiodic TRS resources. For example, for the network device 110 associated with four TRPs 130-1 to 130-4, multiple TRS resource sets each having four aperiodic TRSs may be configured for the terminal device 120. The network device 110 may transmit the aperiodic CJT TRS resource configuration following transmission configuration indication (TCI) states (which will be described in detail as below) of the TRPs.

Alternatively, the network device 110 may transmit the aperiodic CJT TRS resource configuration without any TCI states.

In some embodiments, at 224, the network device 110 may transmit TCI state configuration to the terminal device 120. The TCI state configuration indicates a plurality of potential TCI states for the terminal device, for example, the TCI states of the TCI state configuration may correspond to multiple TRPs that the terminal device may support. The TCI states may be indicated by a medium access control (MAC) control element (CE) or DCI, and may be applied to a CJT PDSCH reception at the terminal device 120.

Depending on the capability of the terminal device 120, one or more of joint TCI states may be configured for the terminal device 120 to provide QCL information (e.g., QCL parameters) for reception of DMRS and PDSCH at the terminal device 120. For the scenario as illustrated in FIG. 1, if the terminal device 120 may support four TRPs, the terminal device 120 may be configured with for example four TCI states.

In some embodiment, each TCI state in the TCI state configuration may indicate reference signals from one valid QCL source. Therefore, each TCI state may be associated with one TRS resource in TRS resource configuration. Specifically, for N TRPs (N is an integer and greater than one), N TRS resources are configured for the terminal device 120, each TRS may provide information related to channel characteristics of a TRP. Accordingly, TRP specific QCL source RS may be provided by a TCI state for each TRP specific CSI-RS resource set and corresponding CSI-RS resource(s) for the purpose of the CSI acquisition. For example, QCL-type A source RS may be provided for a TRS so as to obtain CSI acquisition and DMRS of PDSCH, and QCL-type D source RS may be provided for a TRS so as to obtain the channel condition and support beamforming.

In some embodiments, the QCL source RS types associated with TRS resources may include the following format and parameters:

'typeA': {Doppler shift, Doppler spread, average delay, delay spread}
'typeB': {Doppler shift, Doppler spread}
'typeC': {Doppler shift, average delay}
'typeD': {Spatial Rx parameter}

It should be understood that, these examples of the QCL source RS types associated with TRS resources as described above are only for the purpose of illustration. The QCL source RS types associated with TRS resources may include other formats and/or parameters with the development of the technology.

In some embodiments, at 226, the network device 110 may transmit CSI-RS resource configuration to the terminal device 120. The terminal device 120 may perform a measurement on the CSI-RS, and report a result of the measurements on a set of CSI-RSs to the network device 110, as shown at 230 of the signaling process 200.

At 240, the network device 110 may determine one or more CJT parameters for the CJT transmission based on the received result of the measurements. In some embodiments, the one or more CJT parameters may include one or more of: a pre-coder for the CJT, a rank, or a modulation and coding scheme (MCS) for the CJT. It should be understood that, these parameter are only some examples which are given only for the purpose of illustration, and the network device 110 may determine other parameters related to CJT at 240.

In some embodiments, as shown at 242, the network device 110 may transmit a transmission mode configuration to the terminal device 120. In some embodiments, the transmission mode configuration may indicate a group of potential transmission modes including one or more of: a CJT mode, a non-coherent joint transmission (NCJT) mode, or a dynamic point selection mode. The terminal device 120 may be indicated with the transmission mode and perform transmission according to a selection of a transmission mode indicated by the network device 110.

In some embodiments, following the transmission of the transmission mode configuration, the network device 110 may transmit a transmission mode indication to the terminal device 120, which may trigger the CJT mode. Specifically, the transmission mode indication is transmitted to the terminal device 120 when two or more QCL sources are valid, and the transmission mode indication may indicate the type of the joint transmission, that is, whether the joint transmission type is the CJT mode or the NCJT mode. In case of the CJT mode, the solution as described herein above will be performed; otherwise, a legacy solution may be applied.

At 244, the network device 110 transmits a QCL source configuration to the terminal device 120 based on the result of measurements on a set of CSI-RSs. The QCL source configuration may indicate at least two TCI states that indicate reference signals from valid QCL sources for the CJT of TRSs.

In some embodiments, the QCL source configuration may be indicated by a bitmap. In some embodiments, one bit in the bitmap is associated with one of multiple potential TCI states. The number of bits in the bitmap may be determined depending on the number of the multiple potential TCI states. For example, if there are four potential TCI states, bitmap with a size of four is required and each bit may correspond to one TCI state and is used to indicate whether the TCI state is activated and in turn the QCL source associated therewith is valid. In some embodiments, the number of bits in the bitmap may be determined depending on the number of the multiple potential TRPs. For example, if there are four potential TRPs, a bitmap with a size of four is required and each bit in the bitmap may correspond to one TRP and is used to indicate whether the TRP is the valid QCL source.

In alternative embodiments, the transmission mode indication may be transmitted to the terminal device 120 following the QCL source configuration when two or more QCL sources are valid. In such a case, the transmission mode indication may indicate the type of the joint transmission, that is, whether the joint transmission type is the CJT mode or the NCJT mode.

Figure 3A:
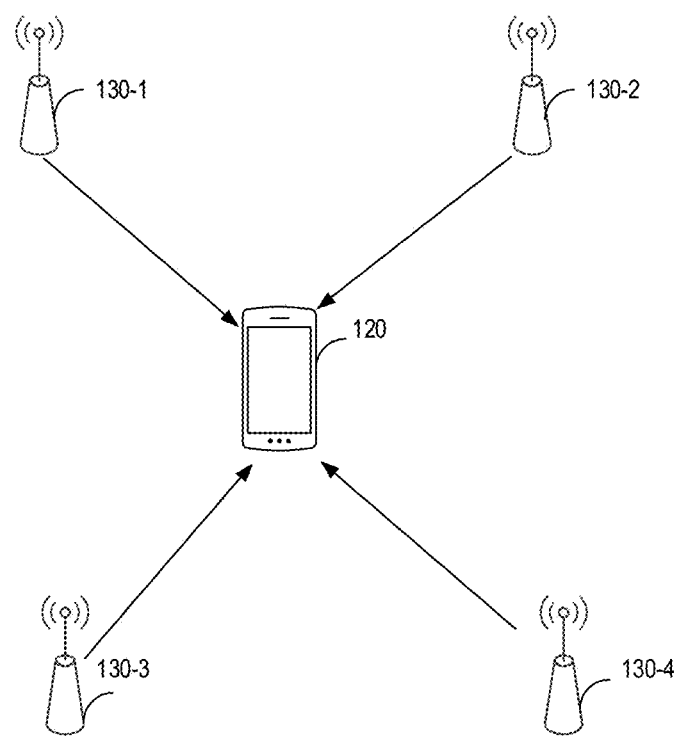
FIGS. 3A-3C illustrate example scenarios for in CJT using multiple TRPs according to embodiments of the present disclosure.
Figure 3B:
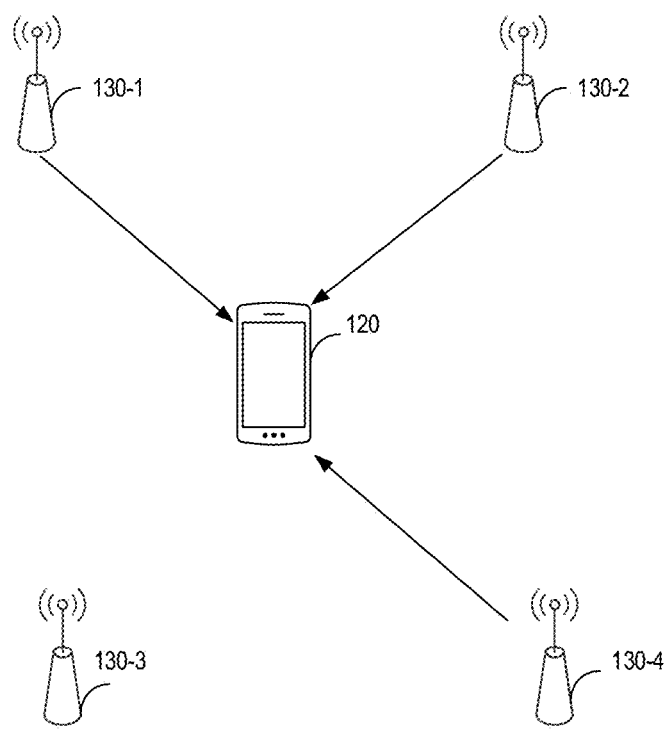
Figure 3C:
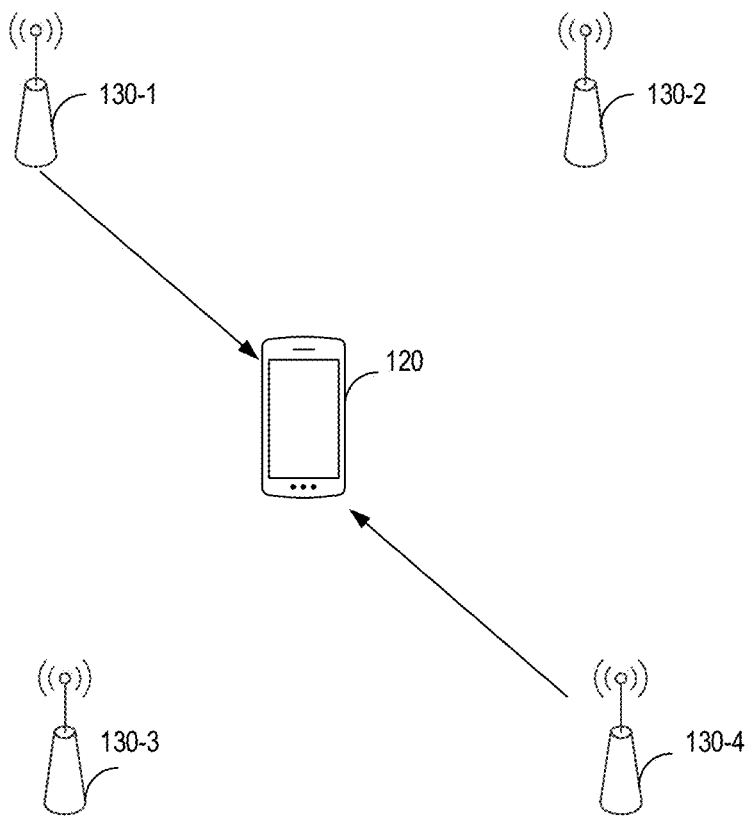

Now a description of the QCL source configuration will be made in detail with references to FIG. 3A-FIG. 3C. FIG. 3A-FIG. 3C illustrate example scenarios of multiple TRPs in CJT according to embodiments of the present disclosure. For the purpose of clarity, the network device associated with the four TRPs is not shown in FIG. 3A-FIG. 3C.

As shown in FIG. 3A, four TRPs are used in the CJT with each of the TRPs transmitting TRS to the terminal device 120. Accordingly, the bitmap indicating the QCL source configuration may have four bits and in this case, it may be for example "1111". The bitmap indicates that all the four TCI states are configured for the CJT transmission and thus all the four TRPs associated with the four TCI states are valid QCL sources.

For example, the QCL source configuration indicates, for example, the first TCI state corresponding to the first TRP 130-1, the second TCI state corresponding to the second TRP 130-2, the third TCI state corresponding to the third TRP 130-3, and the fourth TCI state corresponding to the fourth TRP 130-4. The indicated TCI states may include or indicate information on reference signals from respective valid QCL sources. For example, the first TCI state may indicate reference signals from the first TRP 130-1, the second TCI state may indicate reference signals from TRP 130-2, the third TCI state may indicate reference signals from TRP 130-3, and the fourth TCI state may indicate reference signals from TRP 130-4.

In some embodiments, each of the indicated reference signals from the respective valid sources is provided with a TRP specific TRS resource or resource set, for the purpose of the CSI acquisition. For example, a QCL-type A source RS may be provided for a TRS so as to obtain CSI acquisition and DMRS of PDSCH, and a QCL-type D source RS may be provided for another TRS so as to obtain the channel condition and support beamforming.

Similarly, as shown in FIG. 3B, in a different transmission instant, three TRPs are used in the CJT to transmit TRSs to the terminal device 120. Accordingly, the bitmap indicating the QCL source configuration may be for example "1101", which indicates that the illustrated three TRPs are valid QCL sources.

Specifically, the QCL source configuration may indicate three TCI states, e.g., the first TCI state corresponding to the first TRP 130-1, the second TCI state corresponding to the second TRP 130-2, and the fourth TCI state corresponding to the fourth TRP 130-4. And the indicated TCI states may indicate reference signals from respective valid sources. For example, the first TCI state may indicate reference signals from the first TRP 130-1, the second TCI state may indicate reference signals from the second TRP 130-2, and the fourth TCI state may indicate reference signals from the fourth TRP 130-4.

Similarly, the indicated reference signals from the respective valid sources are provided for each set of TRP specific TRSs for the purpose of the CSI acquisition by the terminal device 110. For example, a QCL-type A source RS may be provided for a TRS so as to obtain CSI acquisition and DMRS of PDSCH, and a QCL-type D source RS may be provided for another TRS so as to obtain the channel condition and support beamforming.

Now refer to FIG. 3C, in a further transmission instant, two TRPs are used in the CJT to transmit TRSs to the terminal device 120. Accordingly, the bitmap indicating the QCL source configuration may be for example "1001", which indicates that two TRPs i.e., the first TRP 130-1 and the fourth TRP 130-4, are valid QCL sources.

Specifically, the QCL source configuration may indicate two TCI states, e.g., the first TCI state corresponding to the first TRP 130-1 and the fourth TCI state corresponding to the fourth TRP 130-4. And the indicated TCI states may indicate reference signals from respective valid sources. For example, the first TCI state may indicate reference signals from the first TRP 130-1 and the fourth TCI state may indicate reference signals from the fourth TRP 130-4.

Similarly, the indicated reference signals from the two respective valid sources are provided for each set of TRP specific TRSs for the purpose of the CSI acquisition by the terminal device 110. For example, a QCL-type A source RS may be provided for a TRS so as to obtain CSI acquisition and DMRS of PDSCH, and a QCL-type D source RS may be provided for another TRS so as to obtain the channel condition and support beamforming.

As all the four TRPs are valid QCL sources for transmitting TRSs as shown in FIG. 3A, the scenario as shown in FIG. 3A may also be used at the initial configuration stage for configuring the terminal device 120 with TRS resource configuration. In addition, when used in the initial configuration stage, the four TRPs may also transmit CSI-RS (not shown in FIG. 3A) to the terminal device 120 for CSI acquisition. In addition, it should be understood that other signals and configurations communicated among the TRPs and the network device 120 may also be possible according to specific applications and requirements. These signals and configurations communicated among the TRPs and the network device 120 will not be elaborated in FIG. 3A for the purpose of simplification.

In some embodiment, the network device 110 may activate the valid QCL sources by any of a medium access control (MAC) control element (CE) or a DCI message. For example, the activation may be implemented by one or more code points. For example, a DCI message may configure a code point corresponding to a QCL source. Therefore, by configuring the code point, the corresponding QCL source may be activated or deactivated.

In some embodiments, the bit width of the code point in the DCI may be configurable. For example, a code point of "00" may activate the second QCL source and the fourth QCL source, and the code point of "01" may activate the third QCL source and the fourth QCL source. An MAC CE may be used to activate the valid sources in a similar way as described with reference to DCI. For a purpose of simplification, repetitive description will not be elaborated.

Reference is made back to FIG. 2, and at 246, the valid TRPs may transmit CJT TRSs. The CJT TRSs are associated with the indicated TCI states. At 250 of the signaling process 200, the terminal device 120 performs a QCL property estimation on received TRSs based on the QCL source configuration. In some embodiments, the QCL property estimation includes estimation on one or more of: doppler shift, doppler spread, average delay, delay spread, or spatial receive parameter. The QCL property estimation may be used for the terminal device 120 to set a channel estimate filter used for detection and reception of DMRS and PDSCH.

At 260, the network device 110 may transmit a scheduling command for PDSCH transmission, and transmit DMRS and scheduled PDSCH. Accordingly, the terminal device 120 may receive the scheduling command for PDSCH transmission and receive the DMRS and the scheduled PDSCH based on the QCL property estimation.

In some embodiments, a scheduled CJT PDSCH and a demodulation reference signal (DMRS) associated with the scheduled CJT PDSCH may be received at an antenna port of the received TRSs. For example, the CJT TRSs may be transmitted using the same precoder with the DMRS associated a layer of the scheduled PDSCH. That is to say, the CJT TRSs have antenna weights as a first layer of the PDSCH or DMRS of the first layer of the scheduled PDSCH. Thus, the terminal device 120 may receive the DMRS and a scheduled CJT PDSCH associated with the DRMS at an antenna port of the received CJT TRSs.

In some embodiments, when the PDSCH is scheduled in a DCI, it may determine the association between the TRS and DRMS associated with the PDSCH. It is known that the DMRS is for demodulation of PDSCH and thus from the DCI scheduling the PDSCH, it may be known which DMRS(s) is associated with the scheduled PDSCH. The latest TRS received at most a predetermined number of time slots before a transmission of the scheduled CJT PDSCH may be determined as the associated TRS. In such a way, the latest TRS may be associated with the DMRS. In this embodiment, the TRS does not require an explicit signaling (for example, a separate DCI) to trigger, and thus the association may be defined in an implicit way.

Alternatively, a separate trigger signaling (for example, DCI) may be used to trigger the TRSs. In such a case, for a scheduled PDSCH, the associated TRSs may include a TRS last triggered by a TRS triggering indication and received at most a predetermined number of time slots before a transmission of the scheduled CJT PDSCH. In this way, the TRS may be associated with the DMRS too. In this solution a separate trigger signaling is used to trigger the TRSs and thus this association is defined in an explicit way.

It is to be appreciated that by transmitting the TRSs at a predetermined number of time slots before transmitting the scheduled CJT PDSCH, the network device 110 may have a time period for prepare for the transmission to ensure an accuracy of transmission. In addition, it should be also understood that, any other scheme of determining an association between the CJT TRSs and the DMRSs may also be used herein.

Figure 4:
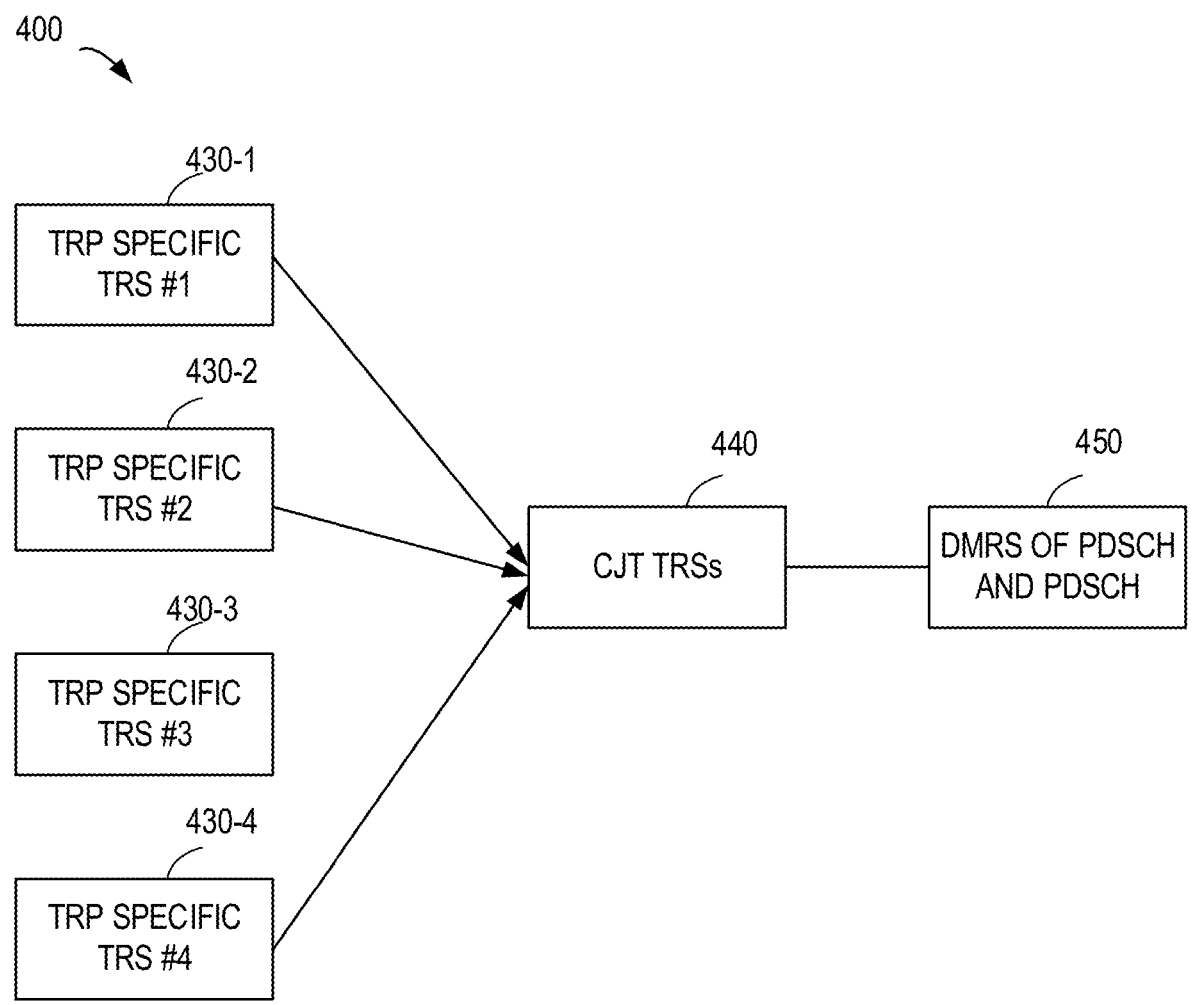
FIG. 4 illustrates an example schematic diagram 400 of receiving CJT TRSs and DMRS according to embodiments of the present disclosure.

For example, FIG. 4 illustrates an example schematic diagram 400 of receiving CJT TRSs and DMRS according to embodiments of the present disclosure. As shown in FIG. 4, three TRP specific TRSs are used in a CJT transmission. For example, the first TRP 130-1 transmits the TRS #1, the second TRP 130-2 transmits the TRS #2, and the fourth TRP 130-4 transmits the TRP #4. The three CJT TPRs are received at corresponding antennae ports and measured by the terminal device at 440. The QCL property may be estimated based on the measurements on TRSs from the three valid TRPs. The terminal device 120 may further receive (450) the DMRS of PDSCH and scheduled PDSCH associated with the DMRS at antenna ports of the received TRS, for example using a same pre-coder which is also used by the terminal device 120 to receive the TRSs.

It should be understood that, although three TRP specific TRSs are shown in FIG. 4, there might be other number of TRP specific TRSs in another different time instant. However, the operations are similar but the number of valid TRPs. For simplification purposes, the detailed description will not be elaborated herein.

Advantageously, by receiving the QCL source configuration indicating at least two TCI states, the terminal device may learn reference signals from valid sources for CJT of TRSs, the terminal device 120 may then perform QCL property estimation on the basis of the QCL source configuration. Therefore, the CJT DMRS and CJT PDSCH may be received based on the estimation and thus the transmission performance and efficiency may be significantly improved.

Figure 5:
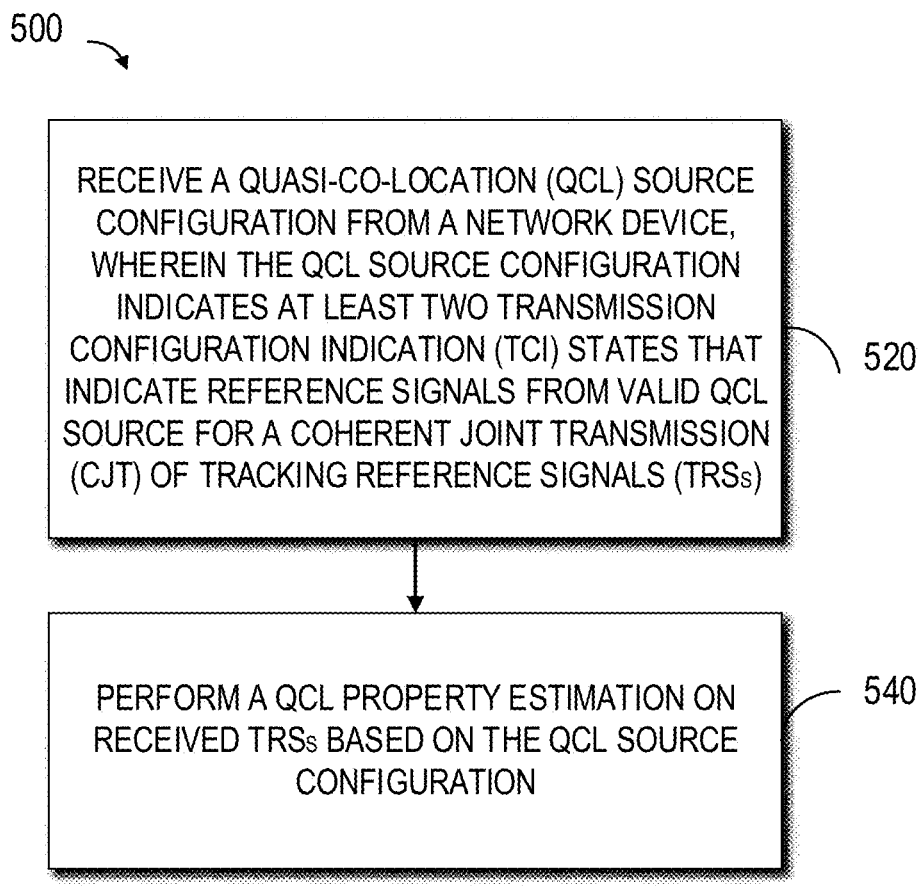
FIG. 5 shows a flowchart of an example method 500 implemented at a terminal device in accordance with some embodiments of the present disclosure.

FIG. 5 shows a flowchart of an example method 500 implemented at a terminal device (for example, the terminal device 120) in accordance with some embodiments of the present disclosure. For the purpose of discussion, the method 500 will be described from the perspective of the terminal device 120 with reference to FIG. 1.

At 520, the terminal device 120 receives a quasi-colocation (QCL) source configuration from a network device, wherein the QCL source configuration indicates at least two transmission configuration indication (TCI) states that indicate reference signals from valid QCL sources for a coherent joint transmission (CJT) of tracking reference signals (TRSs).

In some embodiments, the QCL source configuration may be indicated by a bitmap, and wherein one bit in the bitmap is associated with one of a plurality of potential TCI states.

At 540, the terminal device 120 performs a QCL property estimation on received TRSs based on the QCL source configuration. In some embodiments, the QCL property estimation may include estimation on one or more of: doppler shift, doppler spread, average delay, delay spread, or spatial receive parameter.

In some embodiments, the terminal device 120 may receive a TRS resource configuration for the QCL property estimation of the CJT.

In some embodiments, the TRS resource configuration may be received in a radio resource control (RRC) message, and may indicate one or more TRS resource sets, and wherein each TRS resource set may include four periodic non-zero-power channel state information-reference signal (NZP CSI-RS) resources in two consecutive time slots with two periodic NZP CSI-RS resources in each time slot.

In some embodiments, the TRS resource configuration may be received in downlink control information (DCI) message, and may indicate one or both of an identity of a NZP CSI-RS resource set or an identity of a NZP CSI-RS resource.

In some embodiments, the terminal device 120 may further transmit capability information to the network device, wherein the capability information may indicate that the terminal device supports CJT TRS transmission and CJT physical downlink shared channel (PDSCH) transmission.

In some embodiments, the terminal device 120 may further receive a TCI state configuration indicating a plurality of potential TCI states for the terminal device, wherein each TCI state in the TCI state configuration may be associated with one TRS resource in TRS resource configuration.

In some embodiments, the terminal device 120 may further receive CSI-RS from the network device, perform a measurement on the CSI-RS, and report a result of the measurement to the network device.

In some embodiments, the terminal device 120 may further receive a transmission mode configuration from the network device, wherein the transmission mode configuration may indicate a group of transmission modes including one or more of: a CJT mode, a non-coherent joint transmission, NCJT, mode, or a dynamic point selection mode.

In some embodiments, the terminal device 120 may further receive a transmission mode indication from the network device, wherein the transmission mode indication may trigger the CJT mode.

In some embodiments, the terminal device 120 may further receive a demodulation reference signal (DMRS) and a scheduled CJT PDSCH associated with the DRMS at an antenna port of the received TRSs.

In some embodiments, the received TRSs may include a latest TRS received at most a predetermined number of time slots before a transmission of the scheduled CJT PDSCH.

In some embodiments, wherein the received TRSs may include a TRS last triggered by a TRS triggering indication and received at most a predetermined number of time slots before a transmission of the scheduled CJT PDSCH, and/or wherein the TRS trigger indication may be separated from a scheduling command for scheduling the CJT PDSCH.

In some embodiments, the terminal device 120 may further receive a scheduling command for PDSCH transmission and receive a DMRS and a PDSCH based on the QCL property estimation.

Advantageously, by receiving the QCL source configuration indicating at least two TCI states that indicate reference signals from valid sources for CJT of TRSs, the terminal device 120 may perform QCL property estimation on the basis of the QCL source configuration, therefore, the transmission efficiency can be significantly improved.

Figure 6:
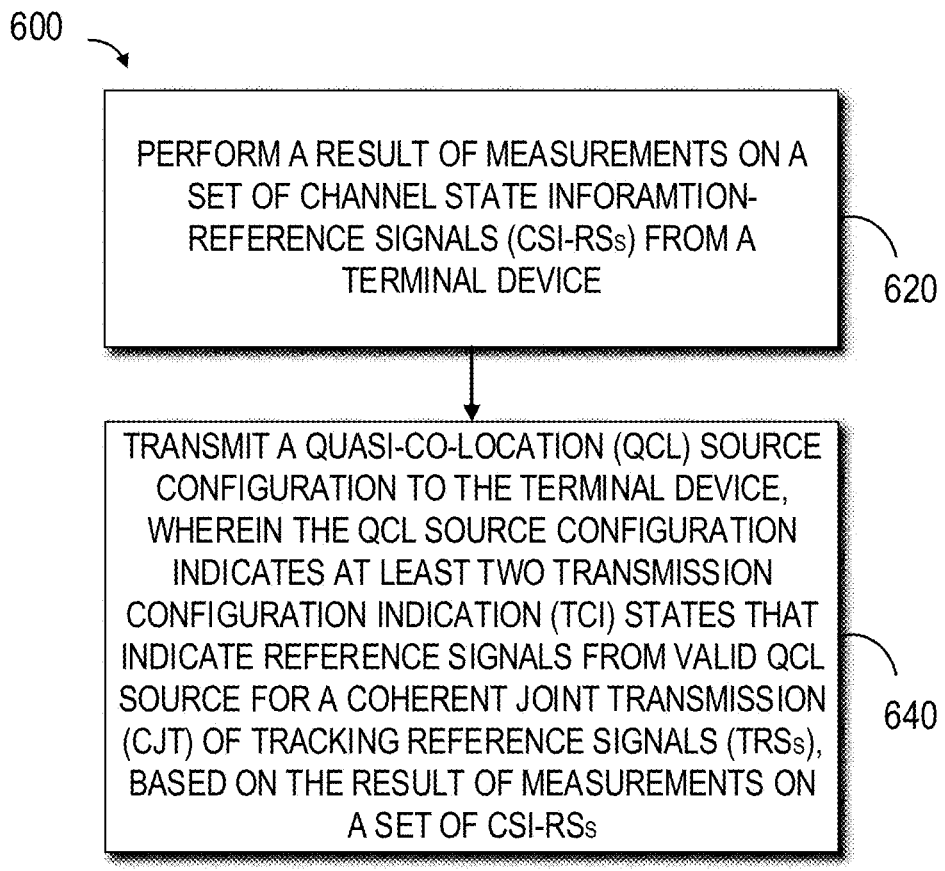
FIG. 6 shows a flowchart of an example method 600 implemented at a network device in accordance with some embodiments of the present disclosure.

FIG. 6 shows a flowchart of an example method 600 implemented at a network device (for example, the network device 110 which may be associated with multiple TRPs for CJT) in accordance with some embodiments of the present disclosure. For the purpose of discussion, the method 600 will be described from the perspective of the network device 110 with reference to FIG. 1.

At 620, the network device 130 receives a result of measurements on a set of channel state information-reference signals (CSI-RSs) from a terminal device.

At 640, the network device 110 transmits a quasi-co-location (QCL) source configuration to the terminal device. The QCL source configuration may indicate at least two transmission configuration indication (TCI) states that indicate reference signals from valid QCL sources for a coherent joint transmission (CJT) of tracking reference signals (TRSs), based on the result of measurements on a set of CSI-RSs.

In some embodiments, the QCL source configuration may be indicated by a bitmap, and wherein one bit in the bitmap may be associated with one of a plurality of potential TCI states.

In some embodiments, the network device 110 may further transmit a TRS resource configuration to the terminal device for a QCL property estimation of the CJT.

In some embodiments, the QCL property estimation may include estimation on one or more of: doppler shift, doppler spread, average delay, delay spread, or spatial receive parameter.

In some embodiments, the TRS resource configuration may be transmitted in a radio resource control (RRC) message, and may indicate one or more TRS resource sets, and wherein each TRS resource set may include four periodic non-zero-power channel state information-reference signal (NZP CSI-RS) resources in two consecutive time slots with two periodic NZP CSI-RS resources in each time slot.

In some embodiments, the TRS resource configuration may be transmitted in downlink control information (DCI) message, and may indicate one or both of an identity of a NZP CSI-RS resource set or an identity of a NZP CSI-RS resource.

In some embodiments, the network device 110 may further receive capability information from the terminal device, wherein the capability information may indicate that the terminal device supports CJT TRS transmission and CJT physical downlink shared channel (PDSCH) transmission.

In some embodiments, the network device 110 may further transmit a TCI state configuration indicating a plurality of potential TCI states for the terminal device, wherein each TCI state in the TCI state configuration may be associated with one TRS resource in TRS resource configuration.

In some embodiments, the network device 110 may further transmit CSI-RS to the terminal device.

In some embodiments, the network device 110 may further determine one or more CJT parameters based on the received result of the measurements, wherein the one or more CJT parameters may include one or more of: a precoder for the CJT, a rank, or a modulation and coding scheme (MCS) for the CJT.

In some embodiments, the network device 110 may further transmit a transmission mode configuration to the terminal device, wherein the transmission mode configuration may indicate a group of transmission modes including one or more of: a CJT mode, a non-coherent joint transmission (NCJT) mode, or a dynamic point selection mode.

In some embodiments, the network device 110 may transmit a transmission mode indication to the terminal device, wherein the transmission mode indication may trigger the CJT mode.

In some embodiments, the network device 110 may further transmit a demodulation reference signal (DMRS) and a scheduled CJT PDSCH associated with the DMRS at an antenna port of transmitted TRSs.

In some embodiments, the transmitted TRSs may include a latest TRS transmitted at most a predetermined number of time slots before a transmission of the scheduled CJT PDSCH.

In some embodiments, the transmitted TRSs may include a TRS last triggered by a TRS triggering indication and transmitted at most a predetermined number of time slots before a transmission of the scheduled CJT PDSCH, wherein the scheduling command may be separated from a DCI triggering the TRSs.

In some embodiments, the network device 110 may further transmit a scheduling command for PDSCH transmission, and transmit a DMRS and a PDSCH based on a QCL property estimation.

In some embodiments, the network device 110 may further activate the valid QCL sources by any of a medium access control (MAC) control element (CE) or a DCI message.

Advantageously, by means of the QCL source configuration indicating at least two TCI states that indicate reference signals from valid sources for CJT of TRSs, the terminal device 120 perform QCL property estimation on the basis of the QCL source configuration, therefore, the transmission efficiency can be significantly improved.

In some embodiments, an apparatus capable of performing any of operations of the method 500 (for example, the terminal device 120) may include means for performing the respective steps of the method 500. The means may be implemented in any suitable form. For example, the means may be implemented in a circuitry or software module.

In some embodiments, the apparatus includes means for receiving a quasi-co-location (QCL) source configuration from a network device. The QCL source configuration indicates at least two transmission configuration indication (TCI) states that indicate reference signals from valid QCL sources for a coherent joint transmission (CJT) of tracking reference signals (TRSs). The apparatus further includes means for performing a QCL property estimation on received TRSs based on the QCL source configuration.

In some embodiments, the QCL source configuration may be indicated by a bitmap, and wherein one bit in the bitmap is associated with one of a plurality of potential TCI states.

In some embodiments, the QCL property estimation may include estimation on one or more of: doppler shift, doppler spread, average delay, delay spread, or spatial receive parameter.

In some embodiments, the apparatus further may include means for receiving a TRS resource configuration for the QCL property estimation of the CJT.

In some embodiments, the TRS resource configuration may be received in a radio resource control (RRC) message, and may indicate one or more TRS resource sets, and wherein each TRS resource set may include four periodic non-zero-power channel state information-reference signal (NZP CSI-RS) resources in two consecutive time slots with two periodic NZP CSI-RS resources in each time slot.

In some embodiments, the TRS resource configuration may be received in downlink control information (DCI)

message, and indicates one or both of an identity of a NZP CSI-RS resource set or an identity of a NZP CSI-RS resource.

In some embodiments, the apparatus further may include means for transmitting capability information to the network device, wherein the capability information may indicate that the terminal device supports CJT TRS transmission and CJT physical downlink shared channel (PDSCH) transmission.

In some embodiments, the apparatus further may include means for receiving a TCI state configuration indicating a plurality of potential TCI states for the terminal device, wherein each TCI state in the TCI state configuration may be associated with one TRS resource in TRS resource configuration.

In some embodiments, the apparatus further may include means for receiving CSI-RS from the network device, means for performing a measurement on the CSI-RS, and means for reporting a result of the measurement to the network device.

In some embodiments, the apparatus further may include means for receiving a transmission mode configuration from the network device, wherein the transmission mode configuration may indicate a group of transmission modes including one or more of: a CJT mode, a non-coherent joint transmission, NCJT, mode, or a dynamic point selection mode.

In some embodiments, the apparatus further may include means for receiving a transmission mode indication from the network device, wherein the transmission mode indication may trigger the CJT mode.

In some embodiments, the apparatus further may include means for receiving a demodulation reference signal (DMRS) and a scheduled CJT PDSCH associated with the DRMS at an antenna port of the received TRSs.

In some embodiments, the received TRSs may include a latest TRS received at most a predetermined number of time slots before a transmission of the scheduled CJT PDSCH.

In some embodiments, the received TRSs may include a TRS last triggered by a TRS triggering indication and received at most a predetermined number of time slots before a transmission of the scheduled CJT PDSCH, and/or wherein the TRS trigger indication may be separated from a scheduling command for scheduling the CJT PDSCH.

In some embodiments, the apparatus may further include means for receiving a scheduling command for PDSCH transmission and receiving a DMRS and a PDSCH based on the QCL property estimation.

Advantageously, by receiving the QCL source configuration indicating at least two TCI states that indicate reference signals from valid sources for CJT of TRSs, the terminal device 120 may perform QCL property estimation on the basis of the QCL source configuration, therefore, the transmission efficiency can be significantly improved.

In some embodiments, an apparatus capable of performing any of the method 600 (for example, the network device 110 associated with multiple TRPs for CJT) may include means for performing the respective steps of the method 600. The means may be implemented in any suitable form. For example, the means may be implemented in a circuitry or software module.

In some embodiments, the apparatus may include means for receiving a result of measurements on a set of channel state information-reference signals (CSI-RSs) from a terminal device. The apparatus may further include means for transmitting a quasi-co-location (QCL) source configuration to the terminal device. The QCL source configuration may indicate at least two transmission configuration indication (TCI) states that indicate reference signals from valid QCL sources for a coherent joint transmission (CJT) of tracking reference signals (TRSs), based on the result of measurements on a set of CSI-RSs.

In some embodiments, the QCL source configuration may be indicated by a bitmap, and wherein one bit in the bitmap is associated with one of a plurality of potential TCI states.

In some embodiments, the apparatus may further include means for transmitting a TRS resource configuration to the terminal device for a QCL property estimation of the CJT.

In some embodiments, the QCL property estimation may include estimation on one or more of: doppler shift, doppler spread, average delay, delay spread, or spatial receive parameter.

In some embodiments, the TRS resource configuration may be transmitted in a radio resource control (RRC) message, and may indicate one or more TRS resource sets, and wherein each TRS resource set may include four periodic non-zero-power channel state information-reference signal (NZP CSI-RS) resources in two consecutive time slots with two periodic NZP CSI-RS resources in each time slot.

In some embodiments, the TRS resource configuration may be transmitted in downlink control information (DCI) message, and may indicate one or both of an identity of a NZP CSI-RS resource set or an identity of a NZP CSI-RS resource.

In some embodiments, the apparatus may further include means for receiving capability information from the terminal device, wherein the capability information may indicate that the terminal device supports CJT TRS transmission and CJT physical downlink shared channel, PDSCH, transmission.

In some embodiments, the apparatus may further include means for transmitting a TCI state configuration indicating a plurality of potential TCI states for the terminal device, wherein each TCI state in the TCI state configuration may be associated with one TRS resource in TRS resource configuration.

In some embodiments, the apparatus may further include means for transmitting CSI-RS to the terminal device.

In some embodiments, the apparatus may further include means for determining one or more CJT parameters based on the received result of the measurements, wherein the one or more CJT parameters may include one or more of: a precoder for the CJT, a rank, or a modulation and coding scheme, MCS, for the CJT.

In some embodiments, the apparatus may further include means for transmitting a transmission mode configuration to the terminal device, wherein the transmission mode configuration may indicate a group of transmission modes including one or more of: a CJT mode, a non-coherent joint transmission (NCJT) mode, or a dynamic point selection mode.

In some embodiments, the apparatus may further include means for transmitting a transmission mode indication to the terminal device, wherein the transmission mode indication may trigger the CJT mode.

In some embodiments, the apparatus may further include means for transmitting a demodulation reference signal (DMRS) and a scheduled CJT PDSCH associated with the DMRS at an antenna port of transmitted TRSs.

In some embodiments, the transmitted TRSs may include a latest TRS transmitted at most a predetermined number of time slots before a transmission of the scheduled CJT PDSCH.

In some embodiments, the transmitted TRSs may include a TRS last triggered by a TRS triggering indication and transmitted at most a predetermined number of time slots before a transmission of the scheduled CJT PDSCH, wherein the scheduling command may be separated from a DCI triggering the TRSs.

In some embodiments, the apparatus may further include means for transmitting a scheduling command for PDSCH transmission, and transmitting a DMRS and a PDSCH based on a QCL property estimation.

In some embodiments, the apparatus may further include means for activating the valid QCL sources by any of a medium access control (MAC) control element (CE) or a DCI message.

It is to be appreciated that, hereinabove, operations at the network device are described in short, for simplification purposes. These operations at the network side might be corresponding to those at the terminal device. Therefore, detailed operations about some of operations or features in FIG. 6, reference may be made to those contents described above for the terminal device with reference to FIGS. 2 and 5.

Advantageously, by means of the QCL source configuration indicating at least two TCI states that indicate reference signals from valid sources for CJT of TRSs, the terminal device 120 may perform QCL property estimation on the basis of the QCL source configuration, therefore, the transmission efficiency can be significantly improved.

In some embodiments, an apparatus capable of performing the method 500 (for example, the terminal device 120) may comprise means for performing the respective steps of the method 500. The means may be implemented in any suitable form. For example, the means may be implemented in a circuitry or software module.

In some embodiments, the apparatus further may comprise means for performing the steps in some embodiments of the method 500. In some embodiments, the means may comprise at least one processor; and at least one memory including computer program code, the at least one memory and computer program code configured to, with the at least one processor, cause the performance of the apparatus.

In some embodiments, the apparatus for performing the method 500 comprises: means for receiving a quasi-co-location (QCL) source configuration from a network device. The QCL source configuration indicates at least two transmission configuration indication (TCI) states that indicate reference signals from valid QCL sources for a coherent joint transmission (CJT) of tracking reference signals (TRSs). The apparatus further may include means for performing a QCL property estimation on received TRSs based on the QCL source configuration.

In some embodiments, an apparatus capable of performing the method 600 (for example, the network device 110) may comprise means for performing the respective steps of the method 600. The means may be implemented in any suitable form. For example, the means may be implemented in a circuitry or software module.

In some embodiments, the apparatus further may comprise means for performing the steps in some embodiments of the method 600. In some embodiments, the means may comprise at least one processor; and at least one memory including computer program code, the at least one memory and computer program code configured to, with the at least one processor, cause the performance of the apparatus.

In some embodiments, the apparatus for performing the method 600 comprises: means for receiving a result of measurements on a set of channel state information-reference signals (CSI-RSs) from a terminal device. The apparatus may further include means for transmitting a quasi-co-location (QCL) source configuration to the terminal device. The QCL source configuration may indicate at least two transmission configuration indication (TCI) states that indicate reference signals from valid QCL sources for a coherent joint transmission (CJT) of tracking reference signals (TRSs), based on the result of measurements on a set of CSI-RSs.

Figure 7:
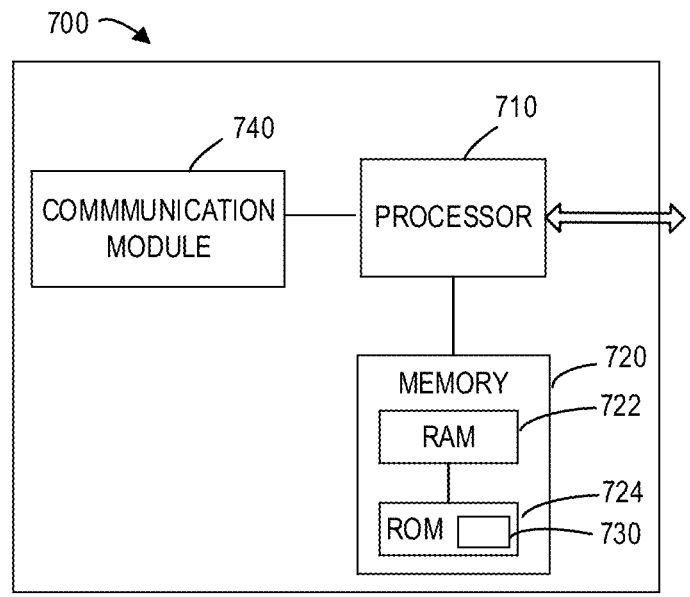
FIG. 7 is a simplified block diagram of a device 700 that is suitable for implementing embodiments of the present disclosure.

FIG. 7 is a simplified block diagram of a device 700 that is suitable for implementing embodiments of the present disclosure. The device 700 may be provided to implement the communication device, for example the terminal device 120 as shown in FIG. 1. As shown, the device 700 includes one or more processors 710, one or more memories 740 coupled to the processor 710, and one or more transmitters and/or receivers (TX/RX) 740 may be coupled to the processor 710.

The TX/RX 740 is for bidirectional communications. The TX/RX 740 may have at least one antenna to facilitate communication. The communication interface may represent any interface that is necessary for communication with other network elements. The communication interface may be hardware or software based interface. For example, the communication interface may be one or more transceivers. The one or more transceivers may be coupled to one or more antennas or antenna ports to wirelessly transmit and/or receive communication signals. The antennas or antenna ports may be the same or different types. The antennas or antenna ports may be located in different positions of an apparatus. The one or more transceivers allow the apparatus to communicate with other devices that may be wired and/or wireless. The transceiver may support one or more radio technologies. For example, the one or more transceivers may include a cellular subsystem, a WLAN subsystem, and/or a Bluetooth™ subsystem. The one or more transceivers may include processors, controllers, radios, sockets, plugs, buffers, or the like circuits to form one or more communication channels to one or more radio frequency units.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a read only memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 may include computer executable instructions that are executed by the associated processor 710. The program 730 may be stored in the ROM 724. The processor 710 may perform any suitable actions and processing by loading the program 1530 into the RAM 722.

The embodiments of the present disclosure may be implemented by means of the program so that the device 700 may perform any process of the disclosure as discussed with reference to FIGS. 1 to 6. The embodiments of the present disclosure may also be implemented by hardware or by a combination of software and hardware.

Figure 8:
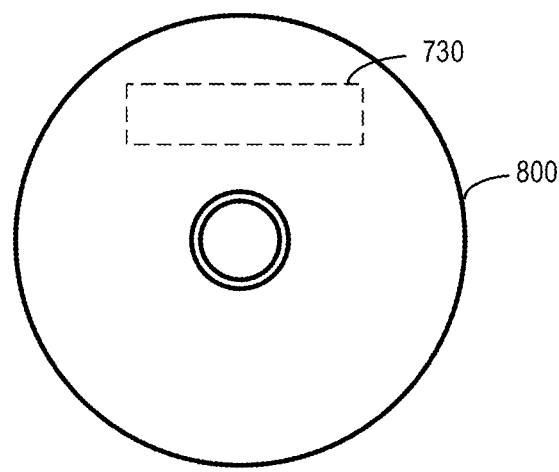
FIG. 8 shows an example of the computer readable medium 800 in form of CD or DVD.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out process signaling 200, the method 500 or 600 as described above with reference to FIGS. 1 to 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:
   at least one processor; and
   at least one memory including computer program codes, wherein the at least one memory and the computer program codes are configured to, with the at least one processor, cause the terminal device to:
   receive a quasi-co-location, QCL, source configuration from a network device, wherein the QCL source configuration indicates at least two transmission configuration indication, TCI, states that indicate reference signals from valid QCL sources for a coherent joint transmission, CJT, of tracking reference signals, TRSs;
   perform a QCL property estimation on received TRSs based on the QCL source configuration; and
   receive a TRS resource configuration for the QCL property estimation of the CJT, wherein the TRS resource configuration is received in downlink control information, DCI, message, and indicates one or both of an identity of a NZP CSI-RS resource set or an identity of a NZP CSI-RS resource.

2. The terminal device of claim 1, wherein the QCL source configuration is indicated by a bitmap, and wherein one bit in the bitmap is associated with one of a plurality of potential TCI states.

3. The terminal device of claim 1, wherein the QCL property estimation comprises estimation on one or more of: doppler shift, doppler spread, average delay, delay spread, or spatial receive parameter.

4. The terminal device of claim 1, wherein the terminal device is further caused to:
transmit capability information to the network device, wherein the capability information indicates that the terminal device supports CJT TRS transmission and CJT physical downlink shared channel, PDSCH, transmission.

5. The terminal device of claim 1, wherein the terminal device is further caused to:
receive a TCI state configuration indicating a plurality of potential TCI states for the terminal device,
wherein each TCI state in the TCI state configuration is associated with one TRS resource in TRS resource configuration.

6. The terminal device of claim 1, wherein the terminal device is further caused to:
receive CSI-RS from the network device;
perform a measurement on the CSI-RS; and
report a result of the measurement to the network device.

7. The terminal device of claim 1, wherein the terminal device is further caused to:
receive a transmission mode configuration from the network device, wherein the transmission mode configuration indicates a group of transmission modes comprising one or more of: a CJT mode, a non-coherent joint transmission, NCJT, mode, or a dynamic point selection mode.

8. The terminal device of claim 7, wherein the terminal device is further caused to:
receive a transmission mode indication from the network device, wherein the transmission mode indication triggers the CJT mode.

9. The terminal device of claim 1, wherein the terminal device is further caused to receive a demodulation reference signal, DMRS, and a scheduled CJT PDSCH associated with the DRMS at an antenna port of the received TRSs.

10. The terminal device of claim 9, wherein the received TRSs comprise a latest TRS received at most a predetermined number of time slots before a transmission of the scheduled CJT PDSCH.

11. A network device, comprising:
at least one processor; and
at least one memory including computer program codes, wherein the at least one memory and the computer program codes are configured to, with the at least one processor, cause the network device to:
receive a result of measurements on a set of channel state information-reference signals, CSI-RSs, from a terminal device;
transmit a quasi-co-location, QCL, source configuration to the terminal device, wherein the QCL source configuration indicates at least two transmission configuration indication, TCI, states that indicate reference signals from valid QCL sources for a coherent joint transmission, CJT, of tracking reference signals, TRSs, based on the result of measurements on a set of CSI-RSs; and
transmit a TRS resource configuration to the terminal device for a QCL property estimation of the CJT, wherein the TRS resource configuration is transmitted in downlink control information, DCI, message, and indicates one or both of an identity of a NZP CSI-RS resource set or an identity of a NZP CSI-RS resource.

12. The network device of claim 11, wherein the QCL source configuration is indicated by a bitmap, and wherein one bit in the bitmap is associated with one of a plurality of potential TCI states.

13. The network device of claim 11, wherein the QCL property estimation comprises estimation on one or more of: doppler shift, doppler spread, average delay, delay spread, or spatial receive parameter.

14. The network device of claim 11, wherein the network device is further caused to:
receive capability information from the terminal device, wherein the capability information indicates that the terminal device supports CJT TRS transmission and CJT physical downlink shared channel, PDSCH, transmission.

15. The network device of claim 11, wherein the network device is further caused to:
transmit a TCI state configuration indicating a plurality of potential TCI states for the terminal device,
wherein each TCI state in the TCI state configuration is associated with one TRS resource in TRS resource configuration.

16. A method at a terminal device, comprising:
receiving a quasi-co-location, QCL, source configuration from a network device, wherein the QCL source configuration indicates at least two transmission configuration indication, TCI, states that indicate reference signals from valid QCL sources for a coherent joint transmission, CJT, of tracking reference signals, TRSs;
performing a QCL property estimation on received TRSs based on the QCL source configuration; and
receiving a TRS resource configuration for the QCL property estimation of the CJT, wherein the TRS resource configuration is received in downlink control information, DCI, message, and indicates one or both of an identity of a NZP CSI-RS resource set or an identity of a NZP CSI-RS resource.

* * * * *